United States Patent [19]
Louder

[11] Patent Number: 5,494,247
[45] Date of Patent: Feb. 27, 1996

[54] E Z PLATE HOLDER

[76] Inventor: Robert Louder, 110 Argentina, Bartonville, Ill. 61607

[21] Appl. No.: 158,217

[22] Filed: Nov. 29, 1993

[51] Int. Cl.⁶ .................................................. F16M 13/00
[52] U.S. Cl. .................... 248/221.12; 40/200; 248/187.1
[58] Field of Search ............................ 248/222.4, 223.1, 248/223.2, 221.3, 221.4, 220.2, 689, 686, 683, 187, 497, 498, 466; 40/200

[56]     References Cited

U.S. PATENT DOCUMENTS

| | | | |
|---|---|---|---|
| 1,699,730 | 1/1929 | Woolf | 40/200 |
| 1,913,082 | 6/1933 | Keagle | 40/200 |
| 2,110,515 | 3/1938 | Weaver | 40/200 |
| 2,157,806 | 5/1939 | Tilton | 40/200 |
| 2,166,994 | 7/1939 | Hogle | 40/200 |
| 2,211,135 | 8/1940 | Kuenning | 40/200 |
| 2,931,471 | 4/1960 | Howard, Jr. | 40/200 X |
| 2,966,107 | 12/1960 | Sanderson | 248/187 |
| 3,147,944 | 9/1964 | Waschevski | 40/200 X |
| 3,196,508 | 7/1965 | Carter | 40/200 X |
| 3,693,921 | 9/1972 | Beaucher | 248/187 |
| 4,953,030 | 8/1990 | Seo | 248/221.4 X |

Primary Examiner—Karen J. Chotkowski
Attorney, Agent, or Firm—John P. Halvonik

[57]     ABSTRACT

A license plate holding apparatus for securing a license plate on an automobile. The apparatus comprises a holder which is attached to the bumper. The holder has openings at each end, (left and right) where a screw may be secured. Tabs slide along a track in connection with each aperture. The tabs have a smaller opening than the aperture which enable the screw to be secured to the tab. The tabs are spring biased toward the openings so that each tab is in the left and right openings when in the normal position. The tabs are connected by a wire to a central pull ring located in the middle of the holder. The pull ring may be pulled out in order to pull the tabs along the track and away from the openings. This allows the screw to be detached from the openings in order to remove the license plate.

2 Claims, 2 Drawing Sheets

E Z PLATE HOLDER

BACKGROUND AND PRIOR ART

The invention relates to the field of license plates and in particular to a holder to enable one to quickly attach or detach a license plate from the bumper of the car.

It is thought that the invention will find use among auto dealers and others who need to quickly add or remove license plates from cars especially among those who often take off plates on a daily basis.

There are no such devices known to the inventor that are of similar construction to the license plate holder to be herein described. That it is there are no devices that the inventor is aware of that have tabs that slide along a track for securing the license plate to the auto and which may then be slid away from the screws to enable one to quickly detach the license plate.

SUMMARY OF THE INVENTION

A license plate holding apparatus for securing a license plate on an automobile. The rear of the apparatus has left and right openings near each end where screws may be used to attach the license plate by placing the screws in the openings in the back of the plate, through apertures in sliding tabs and then into a threaded aperture in the bumper. The tabs slide left and right along a track in connection with each opening. Each tab has a larger aperture that can be removed over the head of the screw and a smaller aperture that cannot. The smaller aperture secures the screw to the holder and the larger aperture is used for removing and attaching the plate. The tabs are connected by a wire or other means to a central pull ring located in the middle of the holder. The pull ring may be pulled out in order to pull the tabs along the track, against the force of the spring, and away from the openings. This allows the screws to be detached through the larger apertures in the tabs in order to remove the license plate quickly.

It is an object of the invention to provide a license plate holder that can enable one to quickly and easily attach or detach license plates from automobiles.

It is another objective of the invention to provide a license plate holder that quickly detach a license plate by simply pulling on a ring.

Other objects of the invention will become known to those skilled in the art once the invention is shown and described.

DESCRIPTION OF THE PREFERRED EMBODIMENT

Figure 1:
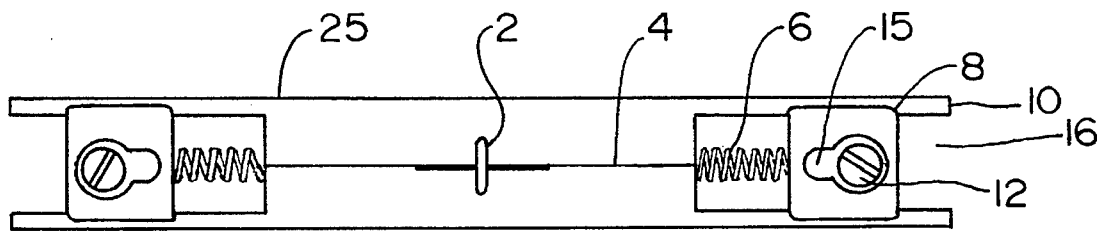
FIG. 1 Front view of tab arrangement, front of device remove, tabs pulled inward.

The interior of the license plate holder 25 is shown in FIG. 1. The front portion of the device has been removed to show the sliding tab arrangement. Screws 12 are shown at the left and right of the holder at each end. The screws are used to secure the license plate by threading them through the opening at the top of the license plate and through the large apertures 14 located in the tabs 8.

The tabs slide along a track 10 at each end of the holder. Thus, there is an opening 16 near the end of each track. A portion of each track (runner) may be above and below the opening. Each tab has a large opening 14 at the outer side of the tab and a smaller opening 15 on the inside. The larger opening 14 is larger than the head of the screw 12. The smaller aperture 15 in the tab is sized so that it just fits around the shank of the screw and is not large enough to allow the head of the screw to pass over it.

Both openings are connected to one another, the outside 14 being that part that is furthest away from the center of the license plate and the inside 15 being closer to the center. The larger opening is large enough to be pulled over the head of the screw and the smaller opening is small enough that it cannot slip over the head of the screw.

Figure 2:
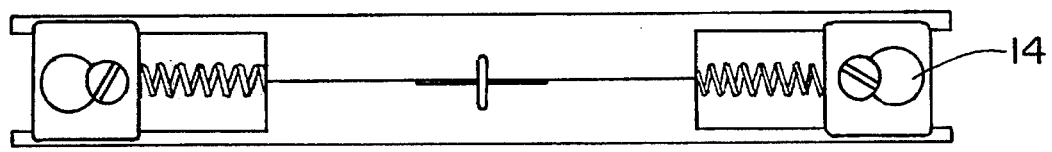
FIG. 2 Front view of tab arrangement, front of device removed, tabs pulled inward.

The tabs slide along a track 10 that is in connection with both ends of the holder. Thus, the tabs may move left and right along the track. Each tab is spring biased so that it is forced toward the outside in the normal at rest position, see FIG. 2. Thus the tab on the right is spring biased toward the right so that it will be as far to the right as the track will allow it to travel. The tab on the left will be biased toward the left so that it will be as far to the left as the track will allow it to go. The track can simply be a pair of grooves located above and below the open portion 16 located at each end of the plate. The track runs along the opening and back toward the middle of the holder. The tabs should be able to slide along these grooves.

Each tab is connected to wire 4 that runs parallel to the track. One wire may be used to connect both tabs or two separate wires may be used. A wire is the preferred means of connection although other means could be used to connect the tabs to the pull ring 2. The pull ring is preferably placed in the middle of the holder although other placements are possible. The pull ring may be pulled away from the holder by the user so that tabs may be pulled away from the openings and along the track. The wire(s) may be threaded through the spring or they could be placed around the spring.

It is thought that the spring 6 that does the biasing will be toward the inside of each tab, that is, the right hand tab will have the spring to its left and the left hand tab will have the spring to its right. Thus, the tabs may be moved against the force of the spring so that they may be pulled toward the inside and away from the screw in order to allow the screw to be removed over the larger portion of the aperture so that the plate may be detached. It is not necessary that the tab move a large distance down the track, only enough distance to allow the aperture in the tab to detach itself from the screw, this could be a fraction of an inch.

Figure 3:
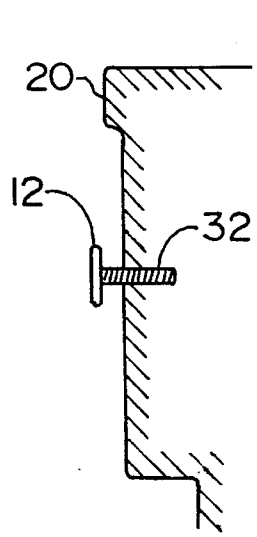
FIG. 3 Side view of bumper.
Figure 4:
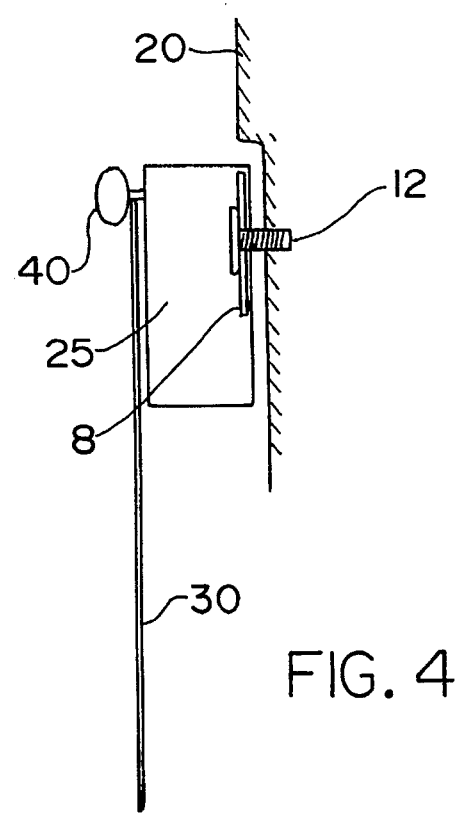
FIG. 4 Side view with plate and apparatus.

To attach the apparatus to the bumper 20, the screw 12 is first inserted into the threaded holes 32 in the bumper (see FIG. 3). Then, the larger apertures 14 are placed over the heads of the screws while the user pulls back on the pull tab in order to place the tabs in the proper position for this, see FIG. 4 (the tabs are in the position shown in FIG. 1 when the user is pulling on the tabs). With the tabs over the screws, the user lets go of the pull tab and the tabs then move into the position shown in FIG. 2 thereby securing the apparatus to the bumper.

Figure 6:
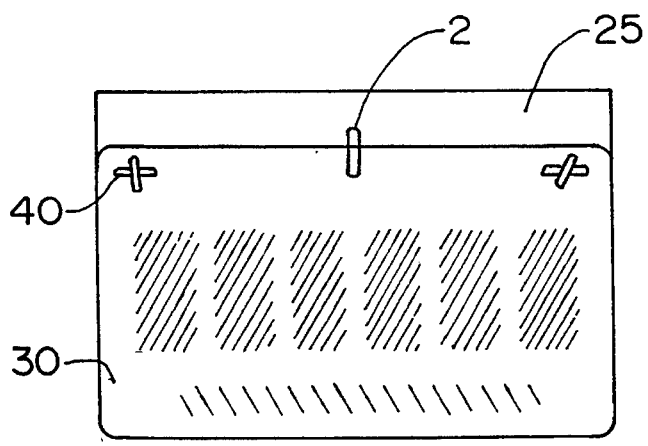
FIG. 6 Front view with license plate.
Figure 5:
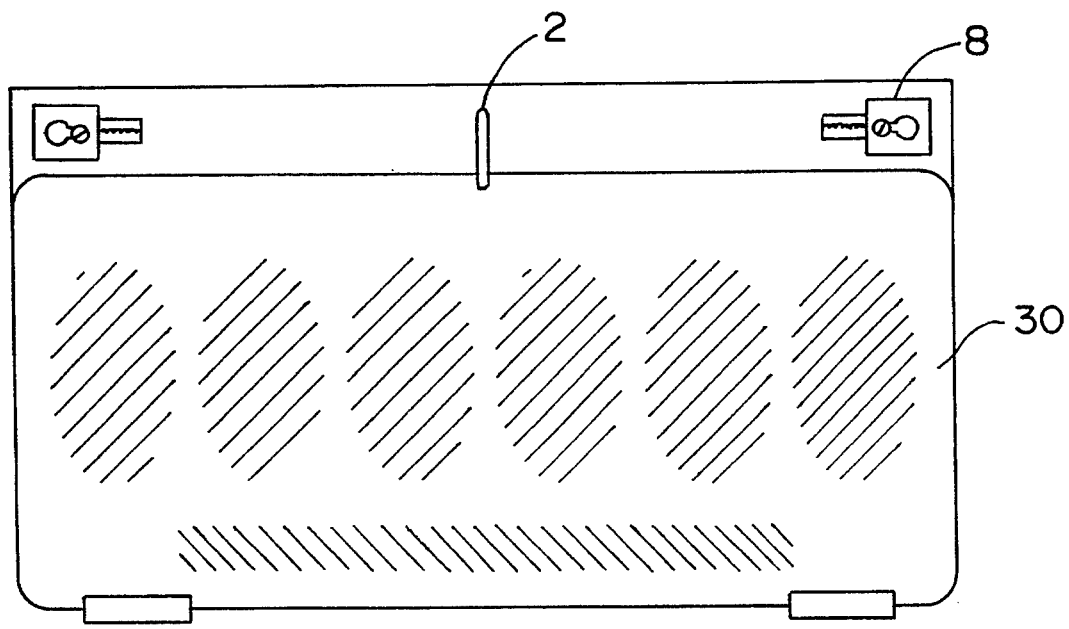
FIG. 5 Front view with license plate, front of device removed.

The license plate 30 may now be attached to the apparatus 25 by placing another attaching means 40 through the top opening in the plate and securing this into for example, a threaded aperture, (behind 40 in FIG. 6) in the front face of the device. FIG. 6 shows the license plate attached in this manner. Note FIG. 5 has the front portion removed. This attaching means 40 may be e.g. screws, etc.

To remove the apparatus from the bumper, one would grasp the ring with the index finger and support the hand on the middle portion of the holder. As one pulls on the pull tab, the right hand tab moves to the left and the left hand tab moves to the right. The tabs thus detach themselves from the screws and the apparatus and license plate may then be removed from the bumper of the car. The license plate may be removed separately from the apparatus by removing the screws 40 from the device.

I claim:

1. A license plate holder for securing license plates by threaded screws that are threaded through openings in the license plates, said holder comprising: housing having left and right compartments large enough for said screws to pass through, a track portion having upper and lower tracks, said track portion running from said left compartment to said right compartment, left and right tabs, each of said tabs having an opening of a size that enables said screws to be threaded into said openings, said tabs mounted in said tracks for sliding movement, biasing means in connection with said left tab for biasing said left tab toward said left compartment, a right hand biasing means in connection with said right tab for biasing said right tab toward said right compartment, a connecting piece in connection with said left and right tabs, a pull ring in connection with said connecting piece and in between said left and right tabs so that said pull ring may be used to pull said left and right tabs away from said screw in order to remove said license plate.

2. The apparatus of claim 1 wherein said opening in said tabs is of U shape so that said tabs may be pulled away from said screws when said screws are threaded in said openings in the license plates.

* * * * *